US008892068B2

(12) United States Patent
Chang et al.

(10) Patent No.: US 8,892,068 B2
(45) Date of Patent: Nov. 18, 2014

(54) REAL-TIME USAGE MONITORING FOR COMMUNICATION DEVICES

(75) Inventors: Patricia Ruey-Jane Chang, San Ramon, CA (US); Louis A. Chan-Lizardo, San Ramon, CA (US); Barry F. Hoffner, Bridgewater, NJ (US); Scott Alan Tiziani, Green Bay, WI (US); Javier Alejandro Ferro, Somerset, NJ (US); Phillip Andrew Ritter, Danville, CA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 133 days.

(21) Appl. No.: 12/793,741

(22) Filed: Jun. 4, 2010

(65) Prior Publication Data
US 2011/0300826 A1    Dec. 8, 2011

(51) Int. Cl.
*H04M 15/00*    (2006.01)
*H04L 12/14*    (2006.01)

(52) U.S. Cl.
CPC ........... *H04L 12/1414* (2013.01); *H04M 15/00* (2013.01); *H04M 15/59* (2013.01); *H04L 12/1403* (2013.01); *H04M 15/8207* (2013.01)
USPC . 455/405; 455/406; 379/114.01; 379/114.16; 379/114.17; 340/870.02

(58) Field of Classification Search
USPC ...................... 455/405–409; 379/114.01–140; 340/870.01–870.44
See application file for complete search history.

(56) References Cited

U.S. PATENT DOCUMENTS

| | | | | |
|---|---|---|---|---|
| 5,684,861 | A * | 11/1997 | Lewis et al. | 455/405 |
| 6,946,972 | B2 * | 9/2005 | Mueller et al. | 340/870.02 |
| 7,053,767 | B2 * | 5/2006 | Petite et al. | 340/531 |
| 7,639,157 | B1 * | 12/2009 | Whitley et al. | 340/870.02 |
| 7,747,240 | B1 * | 6/2010 | Briscoe et al. | 455/405 |
| 7,884,737 | B2 * | 2/2011 | Zigdon et al. | 340/870.02 |
| 7,930,225 | B2 * | 4/2011 | Wahlberg et al. | 705/30 |
| 8,073,384 | B2 * | 12/2011 | Shuey et al. | 455/7 |
| 2001/0041571 | A1 * | 11/2001 | Yuan | 455/445 |
| 2004/0209595 | A1 * | 10/2004 | Bekanich | 455/405 |
| 2005/0272412 | A1 * | 12/2005 | Langsenkamp et al. | 455/414.2 |
| 2006/0181406 | A1 * | 8/2006 | Petite et al. | 340/521 |
| 2008/0045179 | A1 * | 2/2008 | Bekanich et al. | 455/405 |
| 2008/0076385 | A1 * | 3/2008 | Mayer et al. | 455/407 |
| 2009/0181642 | A1 * | 7/2009 | Bekanich | 455/406 |
| 2010/0005012 | A1 * | 1/2010 | Wahlberg et al. | 705/30 |
| 2010/0191612 | A1 * | 7/2010 | Raleigh | 705/26 |

* cited by examiner

*Primary Examiner* — Matthew Sams

(57) ABSTRACT

A subscriber device receives a message from a network device external to the subscriber device, where the network device implements a first metering engine that meters usage of a network service by a subscriber using the subscriber device and where the message includes the subscriber's usage data. The subscriber device includes a second usage metering engine that receives the subscriber's usage data from the usage synchronization unit, and performs real-time metering of the subscriber's usage of the network service, based on the subscriber's usage data received from the network device and independently of the first metering engine of the network device, to generate real-time usage metering data. The second usage metering engine further outputs the real-time usage metering data to a display at the subscriber device.

17 Claims, 12 Drawing Sheets

US 8,892,068 B2

REAL-TIME USAGE MONITORING FOR COMMUNICATION DEVICES

BACKGROUND

Subscriber devices, such as, for example, cellular radiotelephones, utilize units (e.g., airtime minutes or amounts of data) during usage of network services. Some network services permit the subscriber to pre-pay for service units, such as, for example, pre-paying for a certain number of minutes (e.g., 200 minutes) or a certain amount of data transfer (e.g., 50 Megabytes). After the subscriber uses up the pre-paid quota, the subscriber must pre-pay for additional service units to continue using the network services. Other network services permit the subscriber to post-pay for the service. In such cases, the subscriber may pay a flat fee for usage of service units up to a maximum amount, and then pay additional fees for usage of service units (i.e., per additional service unit) beyond the maximum amount for their selected payment plan. In both pre-pay and post-pay service usage, knowledge of a given subscriber's current "used units" or "remaining units" can be beneficial to the subscriber to enable the subscriber to ration their remaining usage of the service units. Currently, there exists no mechanism that permits a subscriber to monitor their service unit usage in real-time such that they can obtain an accurate accounting of their service unit usage at any given moment.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Exemplary embodiments described herein enable real-time monitoring of a subscriber's network service usage through the implementation of usage monitoring engines in the subscriber's device (e.g., the subscriber's cellular telephone) and in a network node that independently monitors the subscriber's network service usage. The usage monitoring engine implemented at the network node that independently monitors the subscriber's network service usage may send updates (e.g., periodically or in a continuous, or nearly continuous, feed) regarding the subscriber's network service usage to the usage monitoring engine implemented at the subscriber's device. The updates may include, for example, updated metered values for the subscriber's used service units and for the service units that remain to be used by the subscriber. The usage metering engine at the subscriber's device may synchronize to the updated metered values to eliminate error drift between the usage values metered at the subscriber's device and the usage values metered at the network node. In one implementation, the network node may send the updated metered values to the subscriber's device via Short Message Service (SMS) messages.

Figure 1:
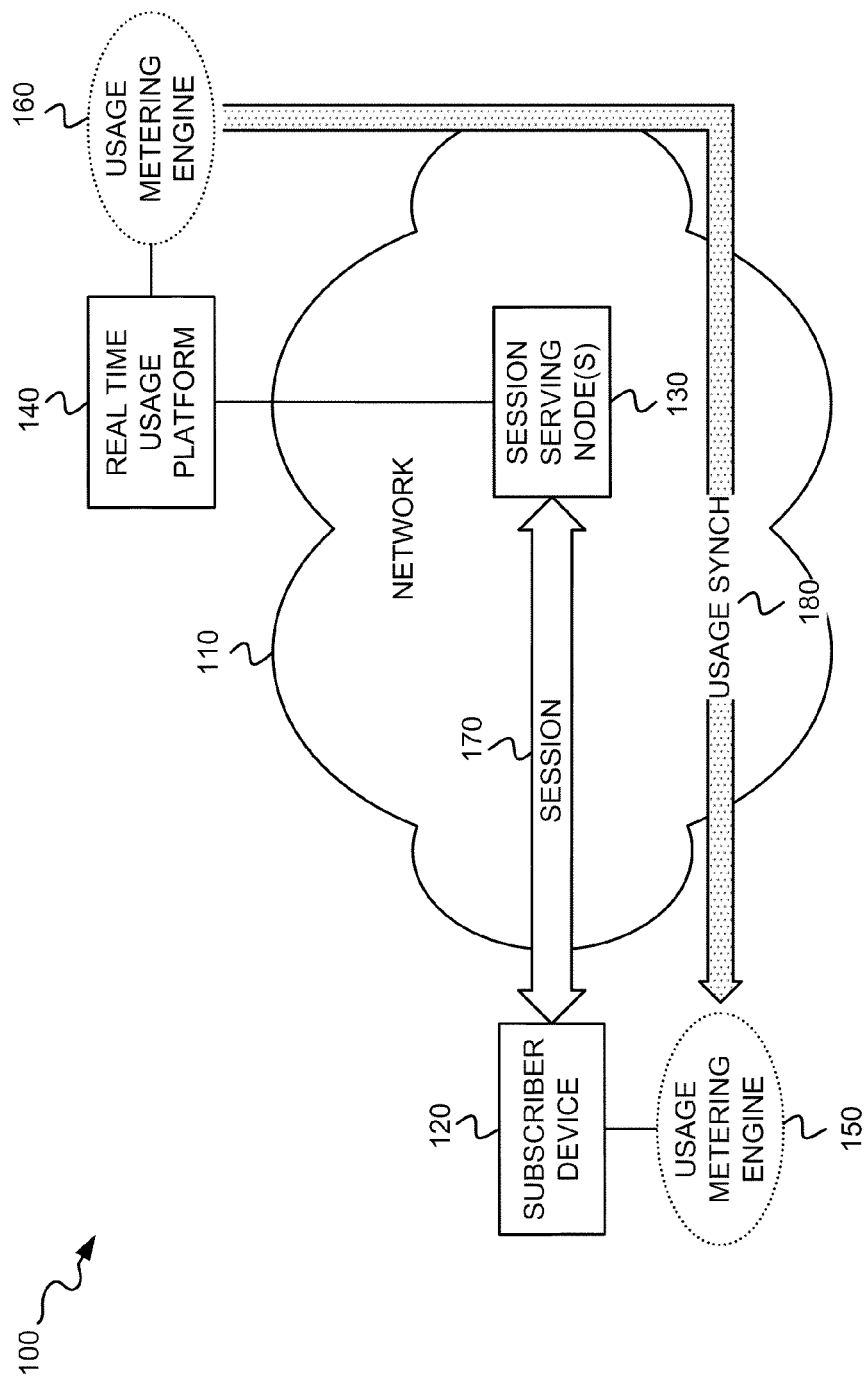
FIG. 1 is a diagram that depicts an exemplary environment in which a subscriber's real-time usage of a network service at a subscriber device may be metered both at the subscriber device and at an external real-time usage platform, and the metering of units may be periodically synchronized between the subscriber device and the real-time usage platform.

FIG. 1 is a diagram that depicts an exemplary environment 100, in which a subscriber's real-time usage of a network service at a subscriber device may be metered both at the subscriber device and at an external real-time usage platform. The metering of units may also be periodically synchronized between the subscriber device and the real-time usage platform. As shown in FIG. 1, environment 100 may include a network 110, a subscriber device 120, a session serving node(s) 130 and a real-time usage platform 140. As further shown in FIG. 1, subscriber device 120 may implement a usage metering engine 150, and real-time usage platform 140 may also implement a separate usage metering engine 160. Usage metering engines 150 and 160 will be described in further detail below. Environment 100 may include additional, fewer and/or different components than those depicted in FIG. 1.

Network 110 may include one or more networks of any type, such as, for example, a local area network (LAN), a wide area network (WAN), a metropolitan area network (MAN), an intranet, the Internet, a wireless satellite network, a cable network (e.g., an optical cable network), and/or one or more wireless public land mobile networks (PLMNs). The PLMN(s) may include a Code Division Multiple Access (CDMA) 2000 PLMN, a Global System for Mobile Communications (GSM) PLMN, a Long Term Evolution (LTE) PLMN and/or other types of PLMNs not specifically described herein.

Subscriber device 120 may include any type of communication device used by a service subscriber. The communication device may include, but are not limited to, a cable network Set-Top Box (STB), a mobile broadband card (i.e., an "air card"), a cellular radiotelephone, a personal digital assistant (PDA), a laptop and/or palmtop computer, a metering device (e.g., for metering water or electrical service usage), or other types of subscriber appliances whose usage may be metered. The service usage may include metering any type of service unit usage including, for example, metering usage of any type of quantifiable and/or tangible service units (e.g., metering amounts of data usage, minutes usage, a number of calls, a number of messages, a number of pings, a number of communications, etc.). Subscriber device 120 may implement usage metering engine 150. Usage metering engine 150 may, based on subscriber network service usage data received from real-time usage platform 140, meter usage of service units by the subscriber to determine, for example, how many service units have been used by the subscriber at any point in time or how many service units remain to be used for the subscriber at any point in time.

Session serving node(s) 130 may include one or more devices associated with establishing and/or maintaining a session 170 with subscriber device 120. Session serving node(s) 130 may include various different types of devices depending on the type of network providing the network service to subscriber device 120. For example, if a GSM PLMN is providing a packet-switched network service (e.g., packet data delivery) to subscriber device 120, then session serving node(s) 130 may include a Gateway General Packet Radio Service (GPRS) Support Node (GGSN) and/or Serving GPRS Support Node (SGSN). As another example, if a GSM PLMN is providing a circuit-switched network service (e.g., voice service) to subscriber device 120, then session serving node(s) 130 may include a base station controller (BSC) and/or mobile switching center (MSC). As a further example, if a CDMA2000 PLMN is providing a packet-switched network service to subscriber device 120, then session serving node(s) 130 may include a Packet Data Serving Node (PDSN). Session serving node(s) 130 may include one or more of any type of nodes in network 120 involved in establishing and/or maintaining session 170 at subscriber device 120. Session 170 may include any type of communication in which subscriber device 120 uses network 110 to communicate with another node. For example, session 170 may include a packet-switched data session in which subscriber device 120 communicates with a server (not shown). As another example, session 170 may include a circuit-switched voice call in which subscriber device 120 communicates with another subscriber device (e.g., with another telephone).

Real-time usage platform 140 may include one or more devices that monitor service unit usage of subscriber device 120 as subscriber device 120 engages in a network service via session serving node(s) 130. Real-time usage platform 140 may implement usage metering engine 160. Usage metering engine 160 may meter usage of service units by the subscriber to determine, for example, how many service units have been used by the subscriber at any point in time or how many service units remain to be used for the subscriber at any point in time. Upon the establishment of session 170, and at certain intervals, usage metering engine 160 may cause usage synchronization (synch) messages 180 to be sent to subscriber device 120 to synchronize the usage metering between usage metering engine 160 and usage metering engine 150.

Implementation of usage metering engine 150 at subscriber device 120 permits the subscriber to obtain real-time metered values for the subscriber's network service usage. Usage synch messages 180 sent from real-time usage platform 140 permit the usage metering carried out by both subscriber device 120 and real-time usage platform 140 to be synchronized such that no significant error drift occurs between the service units metered at usage metering engine 150, and the service units independently metered at usage metering engine 160.

Figure 2:
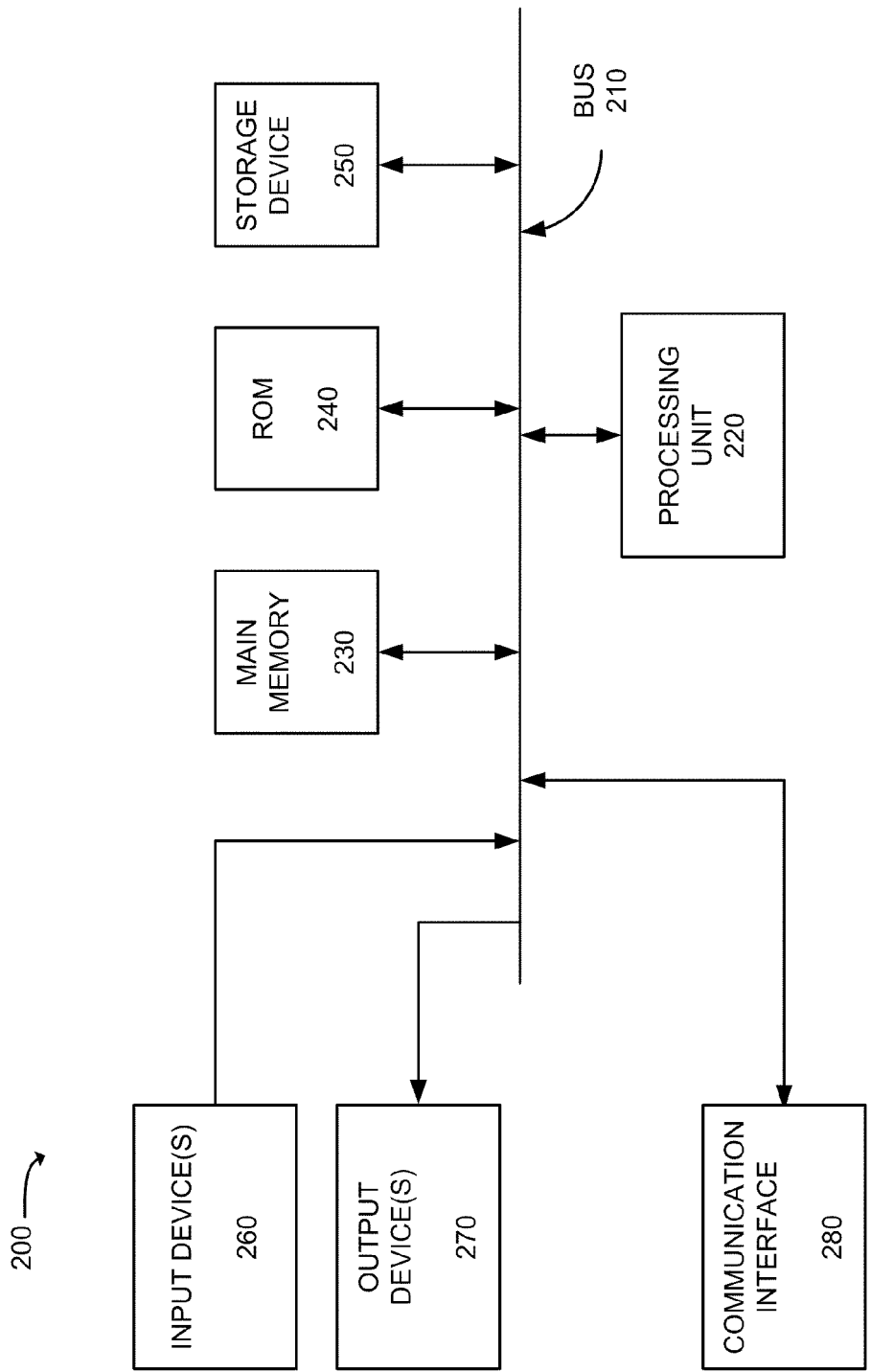
FIG. 2 is a diagram of exemplary components of a device that may correspond to the subscriber device, the session serving node(s) and/or the real-time usage platform of FIG. 1.

FIG. 2 is a diagram of exemplary components of a device 200, which may correspond to subscriber device 120, session serving node(s) 130 and/or real-time usage platform 140. Device 200 may include a bus 210, a processing unit 220, a main memory 230, a read only memory (ROM) 240, a storage device 250, an input device(s) 260, an output device(s) 270, and a communication interface 280. Bus 210 may include a path that permits communication among the elements of device 200.

Processing unit 220 may include a processor, microprocessor, or processing logic that may interpret and execute instructions. Main memory 230 may include a random access memory (RAM) or another type of dynamic storage device that may store information and instructions for execution by processing unit 220. ROM 240 may include a ROM device or another type of static storage device that may store static information and instructions for use by processing unit 220. Storage device 250 may include a magnetic and/or optical recording medium and its corresponding drive.

Input device(s) 260 may include one or more mechanisms that permit an operator to input information to device 200, such as, for example, a keypad or a keyboard, voice recognition and/or biometric mechanisms, etc. Output device(s) 270 may include one or more mechanisms that output information to the operator, including a display, a speaker, etc. Communication interface 280 may include any transceiver mechanism that enables device 200 to communicate with other devices and/or systems. For example, communication interface 280 may include mechanisms for communicating with another device or system via a network, such as network 110. In the case where device 200 represents subscriber device 120, then communication interface 280 may include, for example, a radio frequency transceiver for wireless communication with a PLMN in network 110.

Device 200 may perform certain operations or processes, as may be described in detail below. Device 200 may perform these operations in response to processing unit 220 executing software instructions contained in a computer-readable medium, such as memory 230. A computer-readable medium may be defined as a physical or logical memory device. A logical memory device may include memory space within a single physical memory device or spread across multiple physical memory devices.

The software instructions may be read into main memory 230 from another computer-readable medium, such as storage device 250, or from another device via communication interface 280. The software instructions contained in main memory 230 may cause processing unit 220 to perform operations or processes that will be described later. Alternatively, hardwired circuitry may be used in place of or in combination with software instructions to implement processes consistent with the principles of the invention. Thus, exemplary implementations are not limited to any specific combination of hardware circuitry and software.

The configuration of components of device 200 illustrated in FIG. 2 is for illustrative purposes only. It should be understood that other configurations may be implemented. Therefore, device 200 may include additional, fewer and/or different components than those depicted in FIG. 2.

Figure 3:
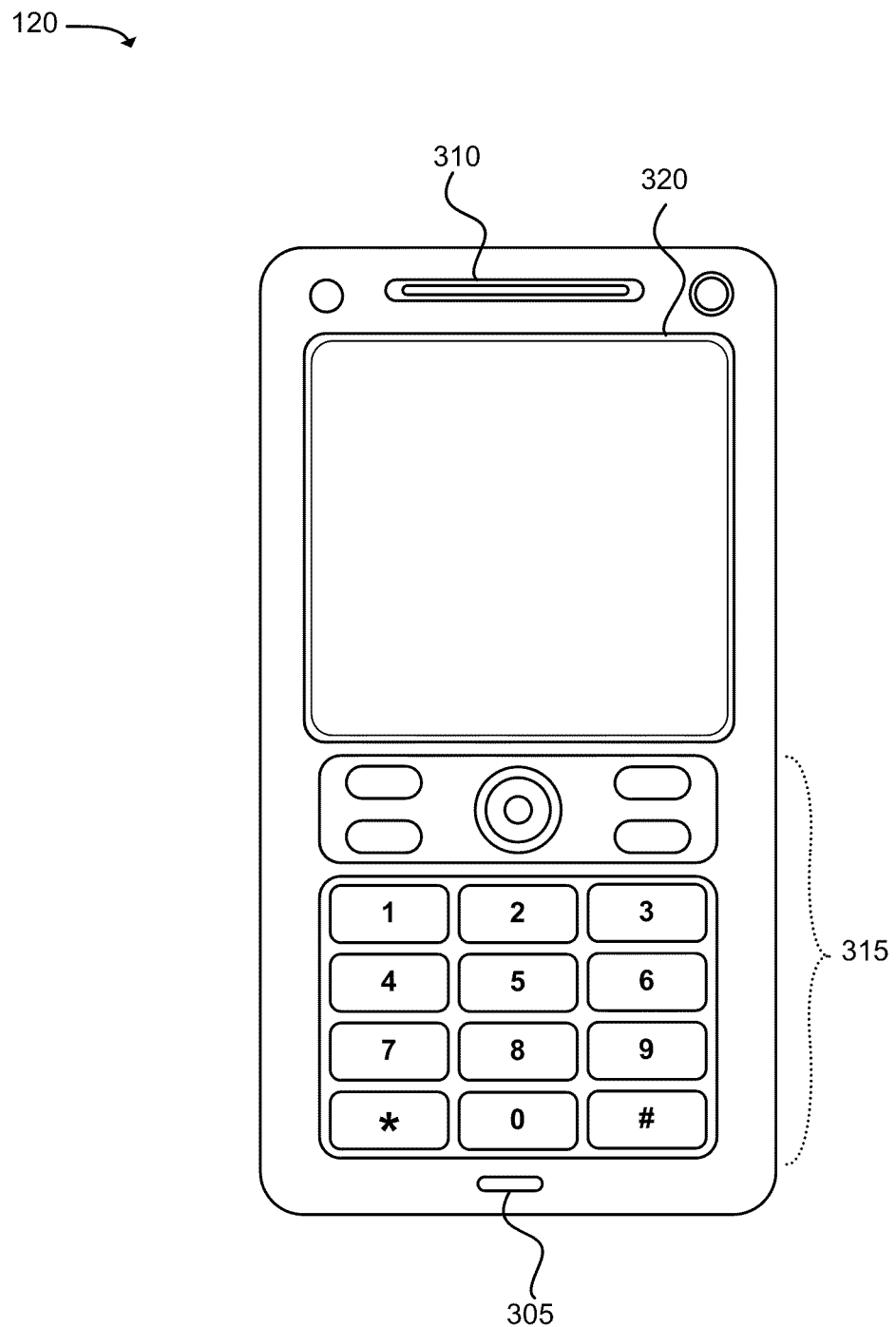
FIG. 3 illustrates an exemplary implementation of the subscriber device of FIG. 1 in which the subscriber device includes a cellular radiotelephone.

FIG. 3 illustrates an exemplary implementation of subscriber device 120 in which subscriber device 120 includes a cellular radiotelephone. As shown in FIG. 3, the cellular radiotelephone may include a microphone 305 (e.g., of input device(s) 260) for entering audio information into device 120, a speaker 310 (e.g., of output device(s) 270) for providing an audio output from device 120, a keypad 315 (e.g., of input device(s) 260) for manual entry of data or selection of device functions, and a display 320 (e.g., of input device(s) 260 or output device(s) 270) that may visually display data to the user and/or which may provide a user interface that the user may use to enter data or to select device functions (in conjunction with keypad 315). Display 320 may include any type of visual display, such as, for example, a liquid crystal display (LCD), a plasma screen display, a light-emitting diode (LED) display, a cathode ray tube (CRT) display, an organic light-emitting diode (OLED) display, etc.

Figure 4:
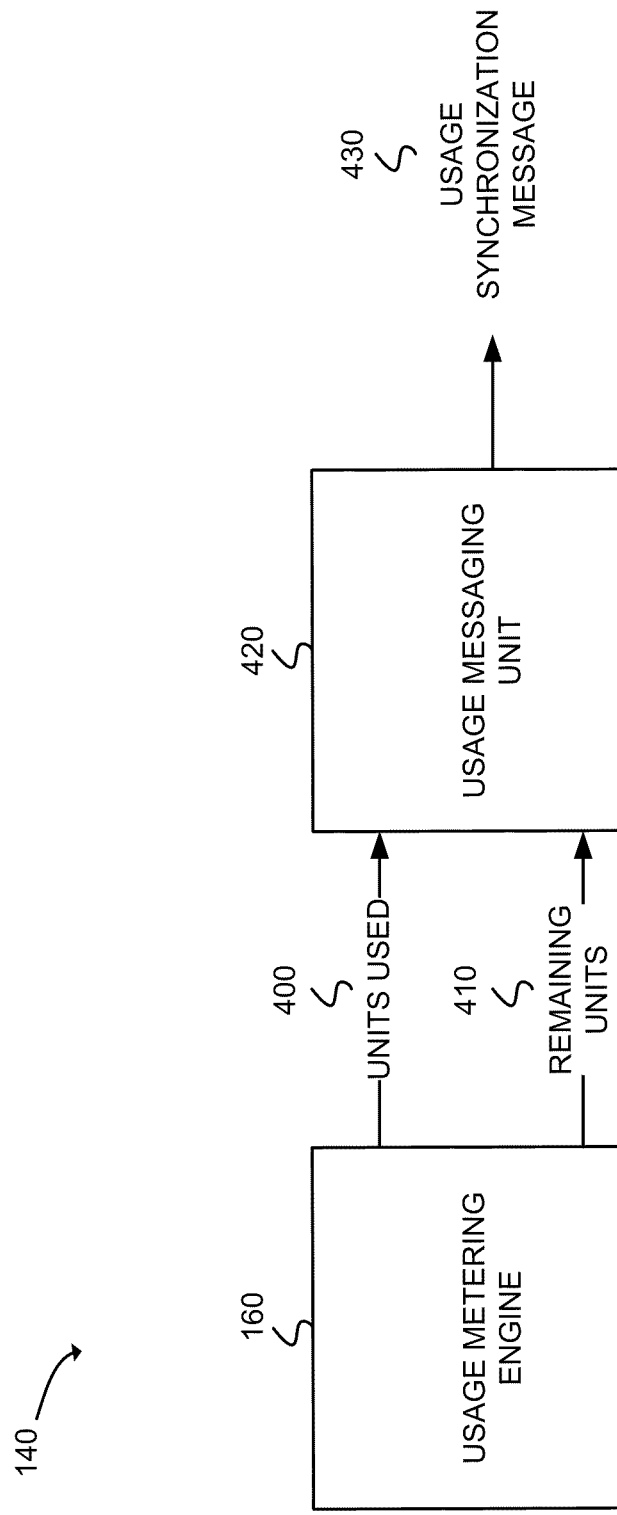
FIG. 4 illustrates exemplary functional components of the real-time usage platform of FIG. 1.

FIG. 4 illustrates exemplary functional components of real-time usage platform 140. Real-time usage platform 140 may include usage metering engine 160, and a usage messaging unit 420. Usage metering engine 160 may meter usage of service units by subscriber device 120 to determine, for example, how many service units have been used by the subscriber (e.g., "units used" 400) at any point in time or how many service units remain to be used for the subscriber (e.g., "remaining units" 410) at any point in time. Usage metering engine 160 may supply values for "units used" 400 and "remaining units" 410 for subscriber device 120 to usage message unit 420. Usage messaging unit 420 may construct a usage synchronization message 430, and include "units used" 400 and "remaining units" 410 within message 430, and may send message 430 to subscriber device 120 via network 110. In an implementation in which subscriber device 120 includes a cellular radiotelephone (e.g., FIG. 3), usage messaging unit 420 may send message 430 to subscriber device 120 as a Short Message Service (SMS) text message, or an Internet Protocol (IP) message. Other types of messaging, however, may alternatively be used.

Figure 5:
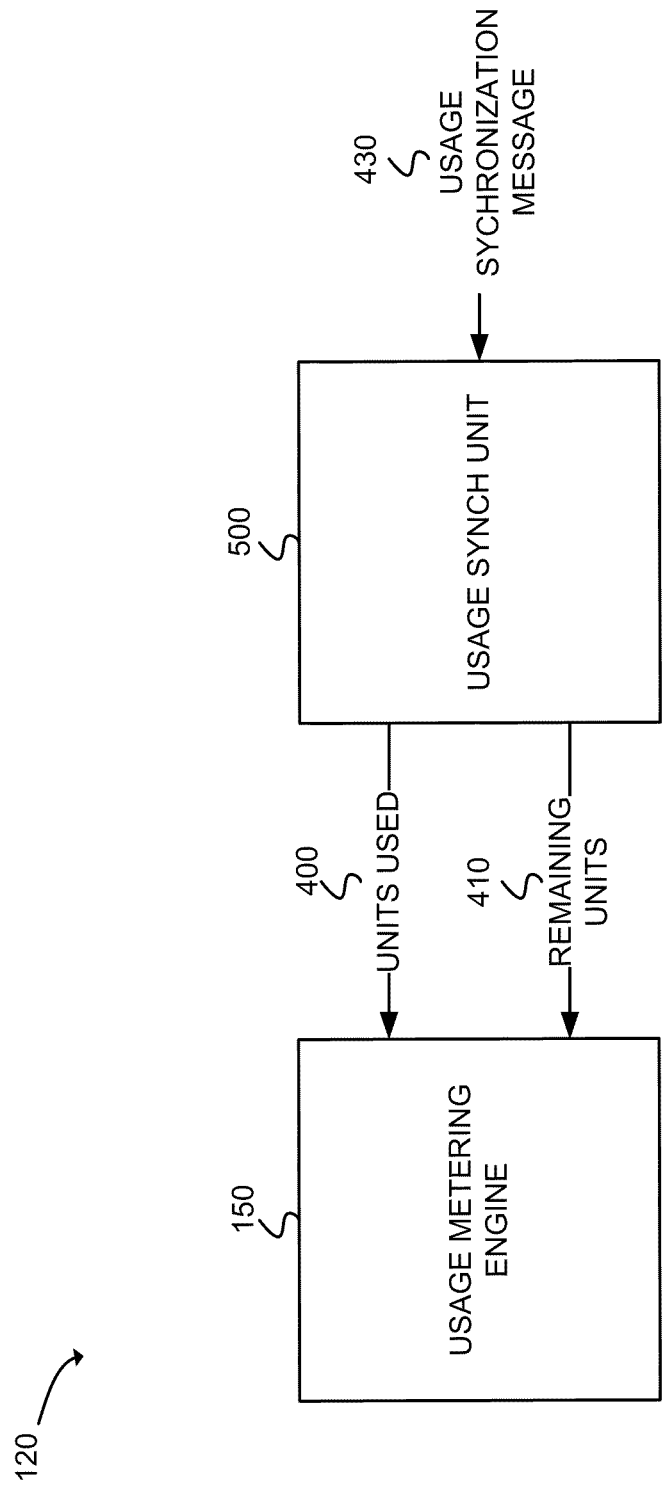
FIG. 5 illustrates exemplary functional components of the subscriber device of FIG. 1.

FIG. 5 illustrates exemplary functional components of subscriber device 120. Subscriber device 120 may include usage metering engine 150, and usage synchronization unit 500. Usage synchronization unit 500 may receive a usage synchronization message 430 from real-time usage platform 140. Usage synchronization unit 500 may extract the "units used" 400 and "remaining units" 410 from message 430, and may then determine whether the values for the "units used" 400 and "remaining units" 410 equal the corresponding metered values currently maintained by usage metering engine 150. If the values do not equal the corresponding metered values currently maintained by usage metering engine 150, usage synch unit 500 may pass the received "units used" 400 and "remaining units" 410 to usage metering engine 150 so that usage metering engine 150 may synchronize the currently maintained metered values to eliminate any error or drift that may have occurred between the usage values metered at usage metering engine 160 of real-time usage platform 140 and at usage metering engine 150 of subscriber device 120. Usage metering engine 150 may continue to meter usage of service units by the subscriber based on the "units used" 400 and "remaining units" 410 received in message 430.

Figure 6A:
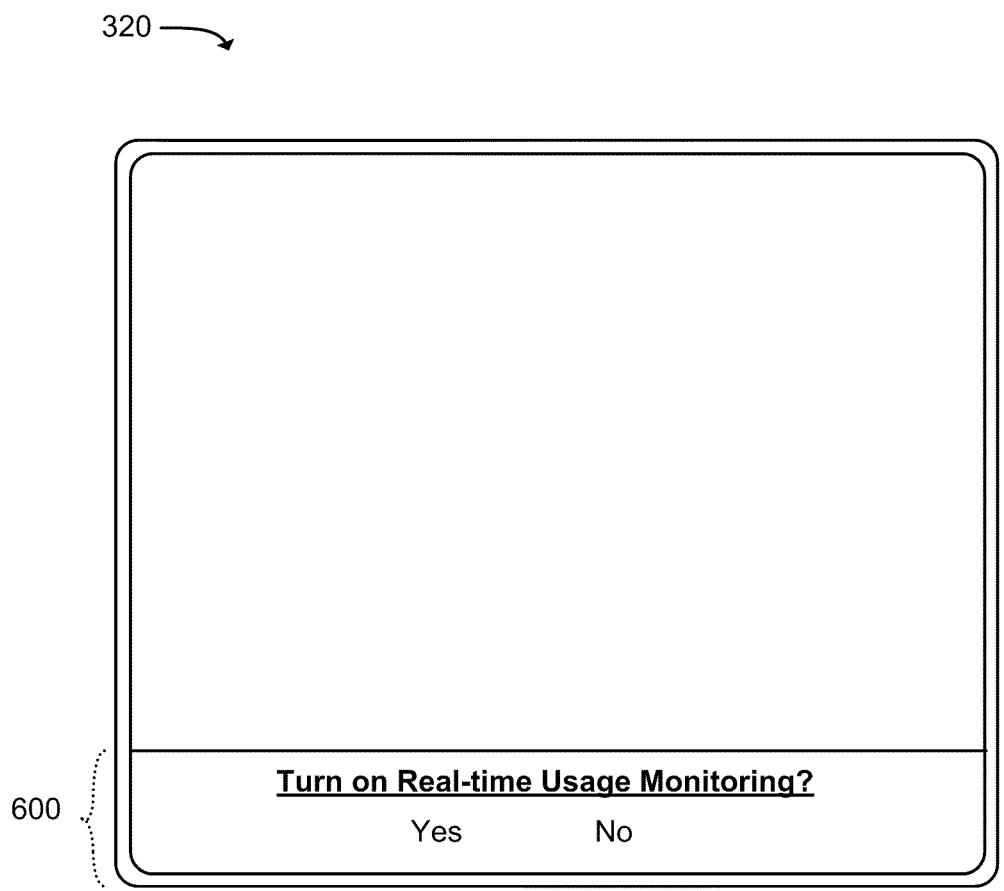
FIGS. 6A and 6B illustrate examples of a display of the subscriber device of FIG. 1 providing a mechanism to activate real-time usage monitoring at the subscriber device, and providing a display of usage metering being performed by a usage metering engine of the subscriber device.
Figure 6B:
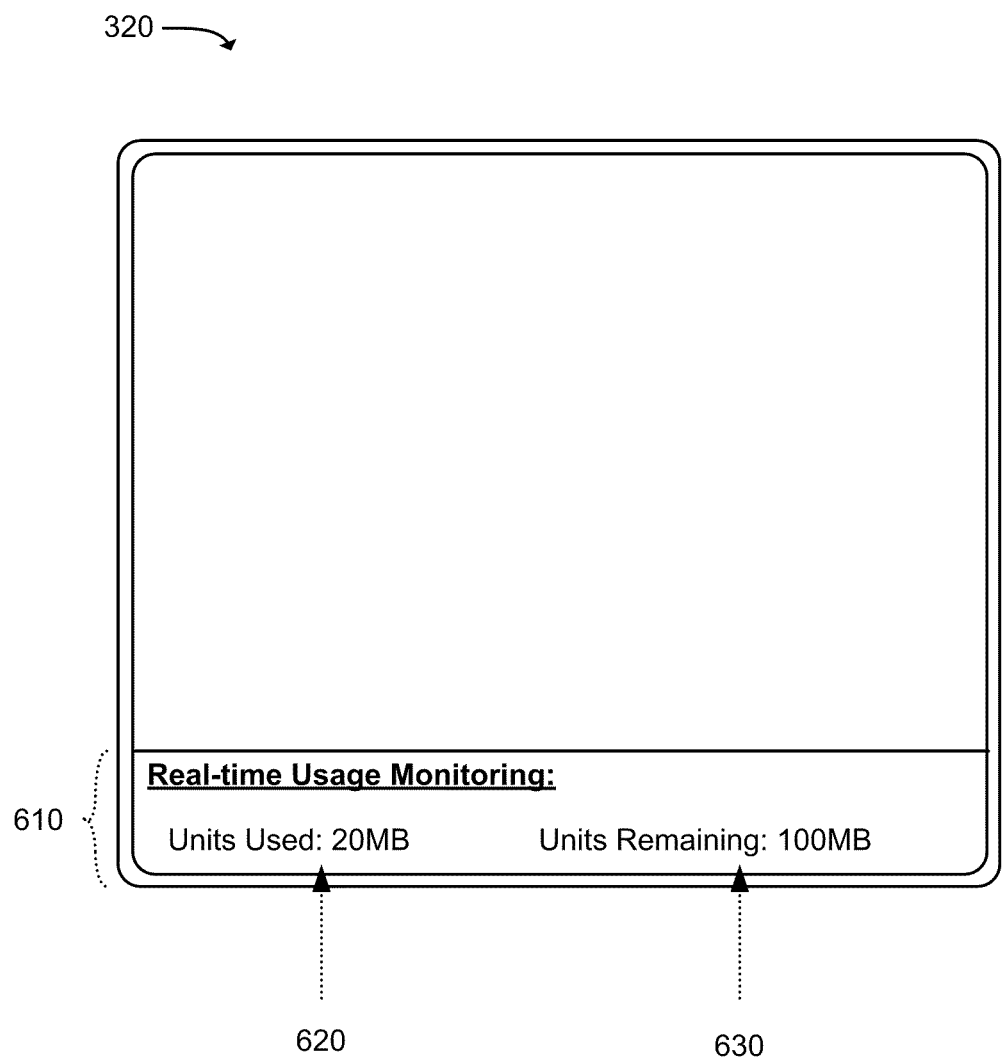

FIGS. 6A and 6B depict examples of display 320 of subscriber device 120 providing a mechanism to activate real-time usage monitoring at subscriber device 120, and providing a display of usage metering being performed by usage metering engine 150 of subscriber device 120. As shown in FIG. 6A, display 320 may include an activation region 600 that may permit the subscriber using subscriber device 120 to activate (i.e., "turn on") real-time usage monitoring. For example, as depicted in FIG. 6A, the subscriber may have the option of choosing "yes" or "no" to activate or deactivate the real-time usage monitoring. If real-time usage monitoring is not activated by the subscriber, then usage metering engine 150 may not meter the subscriber's usage of network services, and usage metering engine 160 at real-time usage platform 140 may not send usage synchronization messages 180 to subscriber device 120 to provide updates on the metering of service unit usage that may be performed by usage metering engine 160. Upon activation of real-time usage monitoring at subscriber device 120, subscriber device 120 may notify real-time usage platform 140 of the activation such that usage metering engine 160 of real-time usage platform 140 may begin providing usage synchronization messages to usage metering engine 150 of subscriber device 120.

As further shown in FIG. 6B, display 320, once real-time usage monitoring has been activated, may include a metering region 610 that may display real-time network service usage data, such as, for example, "units used" 620 and "units remaining" 630 for the subscriber's real-time usage. The real-time usage data may be obtained from usage metering engine 150. The real-time usage data displayed in metering region 610 of display 320 may be continuously updated based on service unit usage metering performed by usage metering engine 150.

Figure 7:
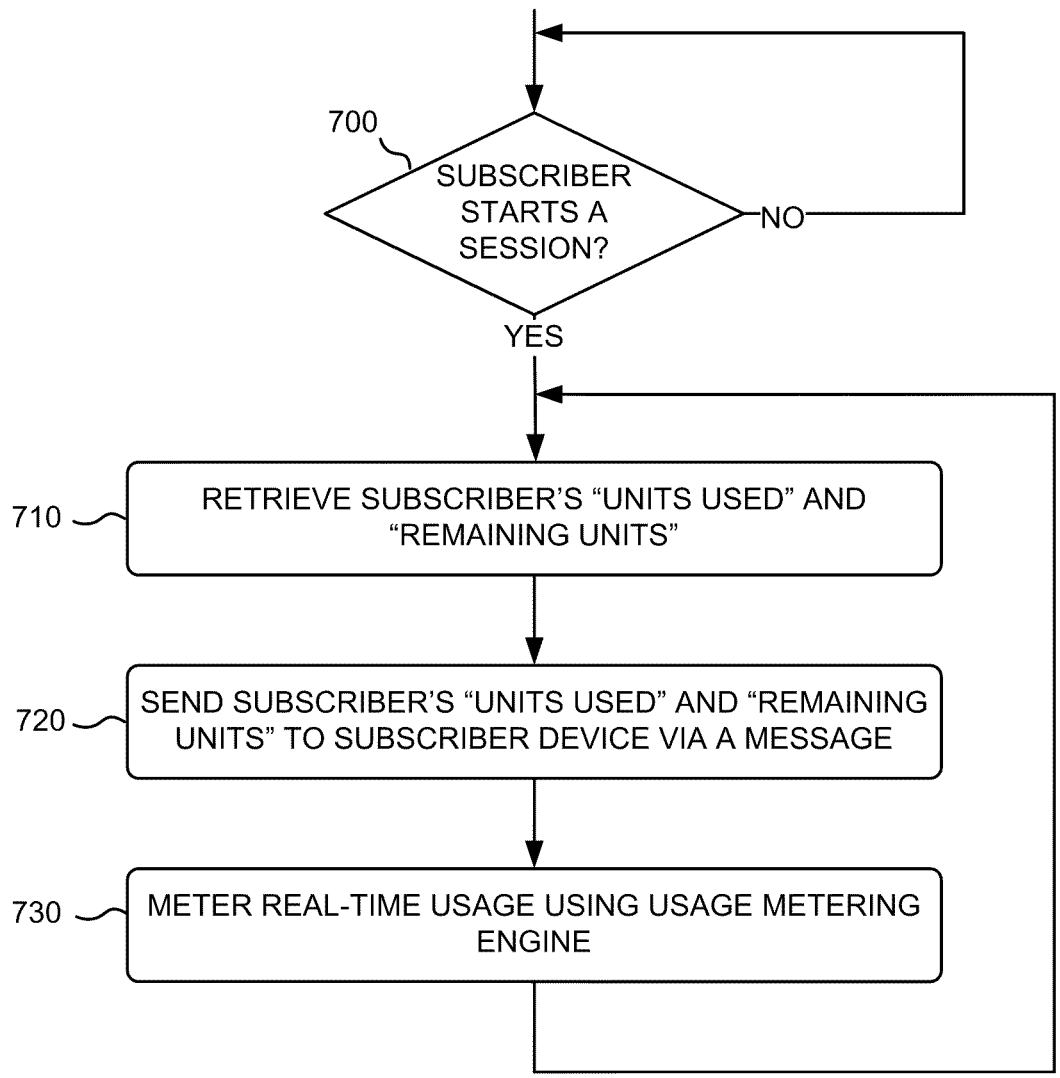
FIG. 7 is a flow diagram illustrating an exemplary process for real-time usage metering performed by the real-time usage platform, and for supplying metering data to the subscriber device for synchronizing the subscriber device's usage metering data with the real-time usage platform's usage metering data.

FIG. 7 is a flow diagram illustrating an exemplary process for real-time usage metering performed by real-time usage platform 140, and for supplying metering data to subscriber device 120 for synchronizing subscriber device 120's usage metering data with real-time usage platform 140's usage metering data. The exemplary process of FIG. 7 is described below with reference to the messaging diagram of FIG. 8. The exemplary process of FIG. 7 may be conditionally executed based on whether the subscriber at subscriber device 120 has activated (i.e., "turned on") real-time usage monitoring, as described above with respect to FIG. 6A.

The exemplary process may include real-time usage platform 140 determining if the subscriber using subscriber device 120 has started a session (block 700). Subscriber device 120 may engage in a session via session serving node(s) 130 and, therefore, real-time usage platform 140 may determine if the subscriber device 120 has started a session by an indication provided by session serving node(s) 130. Referring to the messaging diagram of FIG. 8, subscriber device 120 may send a message 800 to session serving node(s) 130 to start a session. Upon receipt of message 800, session serving node(s) 130 may notify real-time usage platform 140 of the start of the session via a message 805.

Once the subscriber at subscriber device 120 has started a session (YES—block 700), then the subscriber's current "units used" and "remaining units" may be retrieved (block 710). For example, usage metering engine 160 at real-time usage platform 140 may retrieve the subscriber's current "units used" and "remaining units" from memory (e.g., main memory 230). The current values for "units used" and "remaining units" may be stored in memory from a previous session engaged in by subscriber device 120 and/or based on a quota of service units permitted to the subscriber (e.g., a quota of pre-paid service units) and service units already used by the subscriber. Referring to the messaging diagram of FIG. 8, real-time usage platform 140, after receipt of message 805 notifying it of the start of a session by subscriber device 120, may retrieve 810 the subscriber's "units used" and "remaining units." Usage metering engine 160 may then pass the "units used" and "remaining units" to usage messaging unit 420.

The retrieved "units used" and "remaining units" may be sent to subscriber device 120 (block 720). For example, usage messaging unit 420 may generate usage synchronization message 430, which includes "units used" 400 and "remaining units" 410, and may send message 430 to subscriber device 120 via network 110. Referring to the messaging diagram of FIG. 8, real-time usage platform 140 may send a first usage synchronization message 815 to subscriber device 120.

Figure 8:
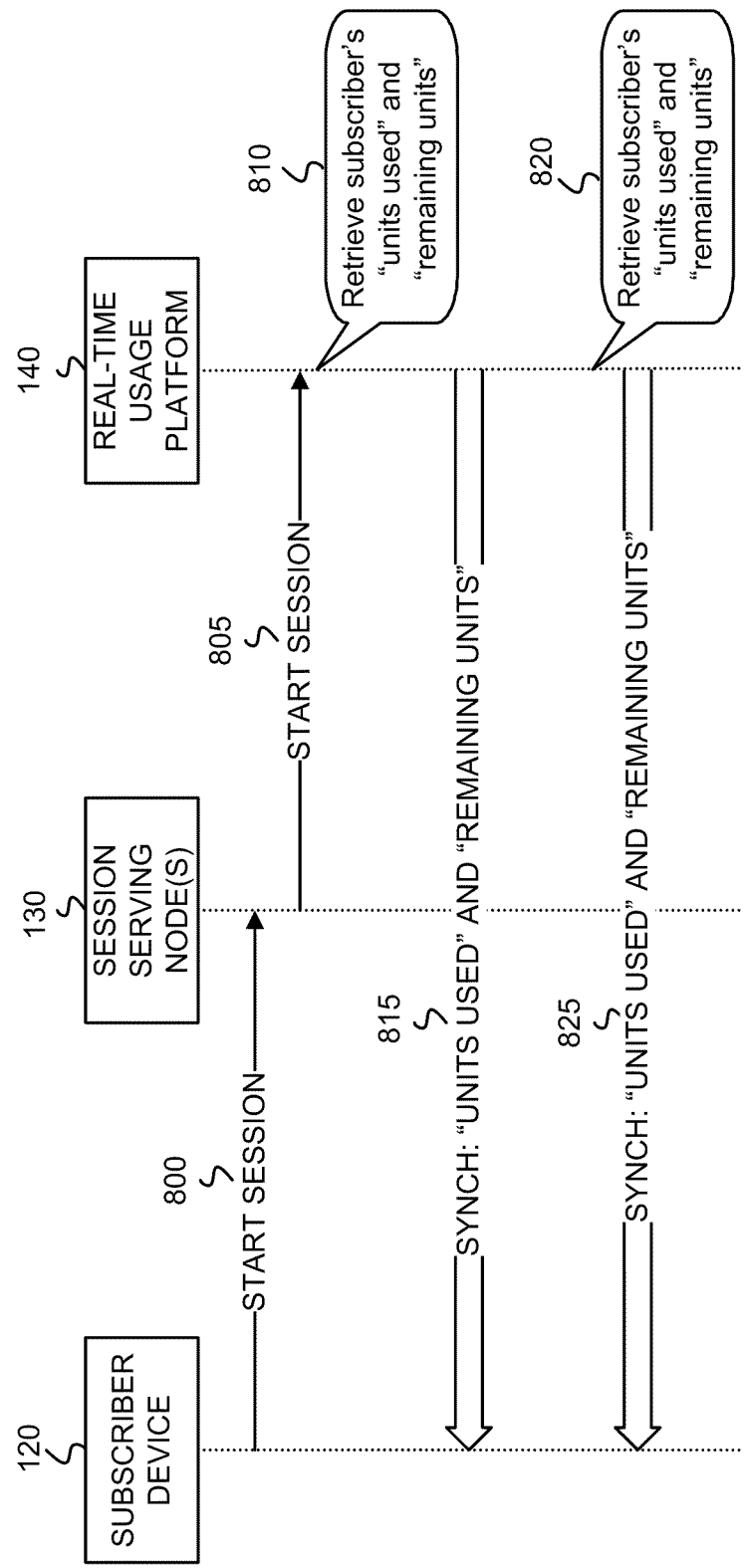
FIG. 8 is an exemplary messaging diagram associated with the exemplary processes of FIGS. 7 and 9.

Usage metering engine 160 may perform real-time metering of the subscriber's usage (block 730). Once the session has started, usage metering engine 160 may meter the subscriber's use of service units during the duration of the session. For example, if the service units comprise amounts of data, then usage metering engine 160 may determine the amount of data being transmitted or received by subscriber device 120 during the session, and may subtract that amount of data from the quota of remaining data available to the subscriber device. As another example, if the service units comprises "air-time" minutes, then usage metering engine 160 may determine the amount of minutes used by subscriber device 120 during the session, and may subtract that amount of minutes from the quota of remaining minutes available to subscriber device 120. Data resulting from the real-time metering of the subscriber's service unit usage by usage metering engine 160 may be updated and stored in memory. During a given session, blocks 710 through 730 may be selectively repeated such that, for example, the subscriber's "units used" and "remaining units" may be repeatedly sent to subscriber device 120. In some implementations, the subscriber's "units used" and "remaining units" may be sent periodically during the session (e.g., every two minutes). In other implementations, the subscriber's "units used" and "remaining units" may be sent in a continuous, or nearly continuous, fashion (e.g., a continuous feed) to subscriber device 120. In additional implementations, the subscriber's "units used" and "remaining units" may be sent to subscriber device 120 when the subscriber's "remaining units" falls below a predetermined threshold (i.e., a warning message alerting the subscriber of a certain usage). The messaging diagram of FIG. 8 depicts a subsequent retrieval 820 of the subscriber's "units used" and "remaining units" and the sending of a subsequent usage synchronization message 825 to subscriber device 120 containing the retrieved "units used" and "remaining units."

Figure 9:
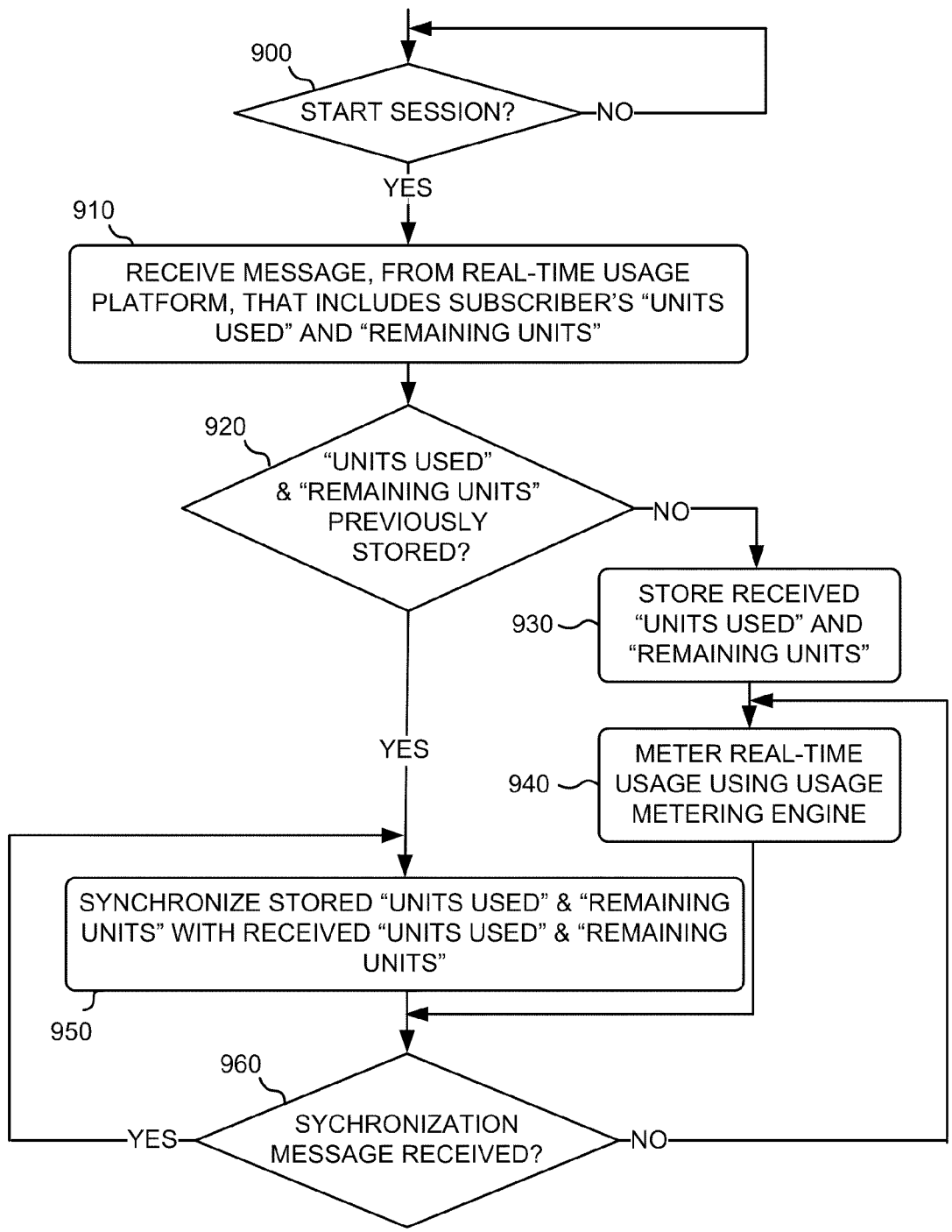
FIG. 9 is a flow diagram illustrating an exemplary process for real-time usage metering performed by the subscriber device, and for synchronizing the subscriber device's usage metering engine to metering data received from the real-time usage platform 140.

FIG. 9 is a flow diagram illustrating an exemplary process for real-time usage metering performed by subscriber device 120, and for synchronizing device 120's usage metering engine 150 to metering data received from real-time usage platform 140. The exemplary process of FIG. 9 is described below with reference to the messaging diagram of FIG. 8. The exemplary process of FIG. 9 may be conditionally executed based on whether the subscriber at subscriber device 120 has activated (i.e., "turned on") real-time usage monitoring, as described above with respect to FIG. 6A.

The exemplary process may include determining if the subscriber using subscriber device 120 has started a session (block 900). Usage metering engine 150 of subscriber device 120 may determine that the subscriber has started a session when the subscriber initiates a data session, or when the subscriber initiates a call, via subscriber device 120. A message may be received, from real-time usage platform 140, that includes the subscriber's "units used" and "remaining units" (block 910). Usage synch unit 500 of subscriber device 120 may receive the "units used" and "remaining units" from real-time usage platform 140 via network 110. Referring back to the messaging diagram of FIG. 8, subscriber device 120 may receive a usage synchronization message 815 from real-time usage platform 140 via network 110.

Usage synchronization unit 500 may determine whether subscriber device 120 has previously stored "units used" or "remaining units" (block 920). If not, then the received "units used" and "remaining units" may be stored (block 930). Usage synchronization unit 500, upon receipt of the "units used" and "remaining units" may store these values in memory (e.g., main memory 230). The subscriber's real-time usage may be metered using usage metering engine 150 (block 940). Once the session has started, usage metering engine 150 may meter the subscriber's use of service units during the duration of the session. This metering may occur independently of the metering being performed by usage metering engine 160 at real-time usage platform 140 (and the usage metering performed at real-time usage platform 140 may be performed independently of the metering performed at subscriber device 120). For example, if the service units comprise amounts of data, then usage metering engine 150 may determine the amount of data being transmitted or received by subscriber device 120 during the session, and may subtract that amount of data from the quota of remaining data available to the subscriber device. As another example, if the service units comprises "air-time" minutes, then usage metering engine 150 may determine the amount of minutes used by subscriber device 120 during the session, and may subtract that amount of minutes from the quota of remaining minutes available to the subscriber device. Data resulting from the real-time metering of the subscriber's service unit usage by usage metering engine 150 may be updated and stored in memory (e.g., main memory 230) at subscriber device 120. Additionally, the data resulting from the real-time metering of the subscriber's network service unit usage may be continuously displayed at subscriber device 120, such as shown in FIG. 6B. The exemplary process may continue at block 960, as described below.

Returning to block 920, if subscriber device 120 has previously stored "units used" or "remaining units," then the stored "units used" and "remaining units" may be synchronized with the "units used" and "remaining units" received from real-time usage platform 140 (block 950). To achieve this synchronization, usage synchronization unit 500 may determine whether the value for the stored "units used" is equal to the value for the received "units used." If the values are not equal, then usage synchronization unit 500 may set the value for the stored "units used" to the value of the received "units used." Similarly, usage synchronization unit 500 may determine whether the value for the stored "remaining units" is equal to the value of the received "units used." If the values are not equal, then usage synchronization unit 500 may set the value for the stored "remaining units" equal to the value of the received "remaining units."

Subscriber device 120 may determine if a synchronization message has been received from real-time usage platform 140 (block 960). Real-time usage platform 140 may send synchronization messages periodically to subscriber device 120 to allow synchronization of the metering data used by usage metering engine 160 and usage metering engine 150. If a synchronization message has been received, then the exemplary process may return to block 950 with a re-synchronization of the stored "units used" and "remaining units" with the "units used" and "remaining units" contained in the synchronization message. If a synchronization message is not received from real-time usage platform 140, then usage metering engine 150 may continue with its metering of the subscriber's real-time usage (block 940). The exemplary process may then continue at block 960, as described above.

Figure 10:
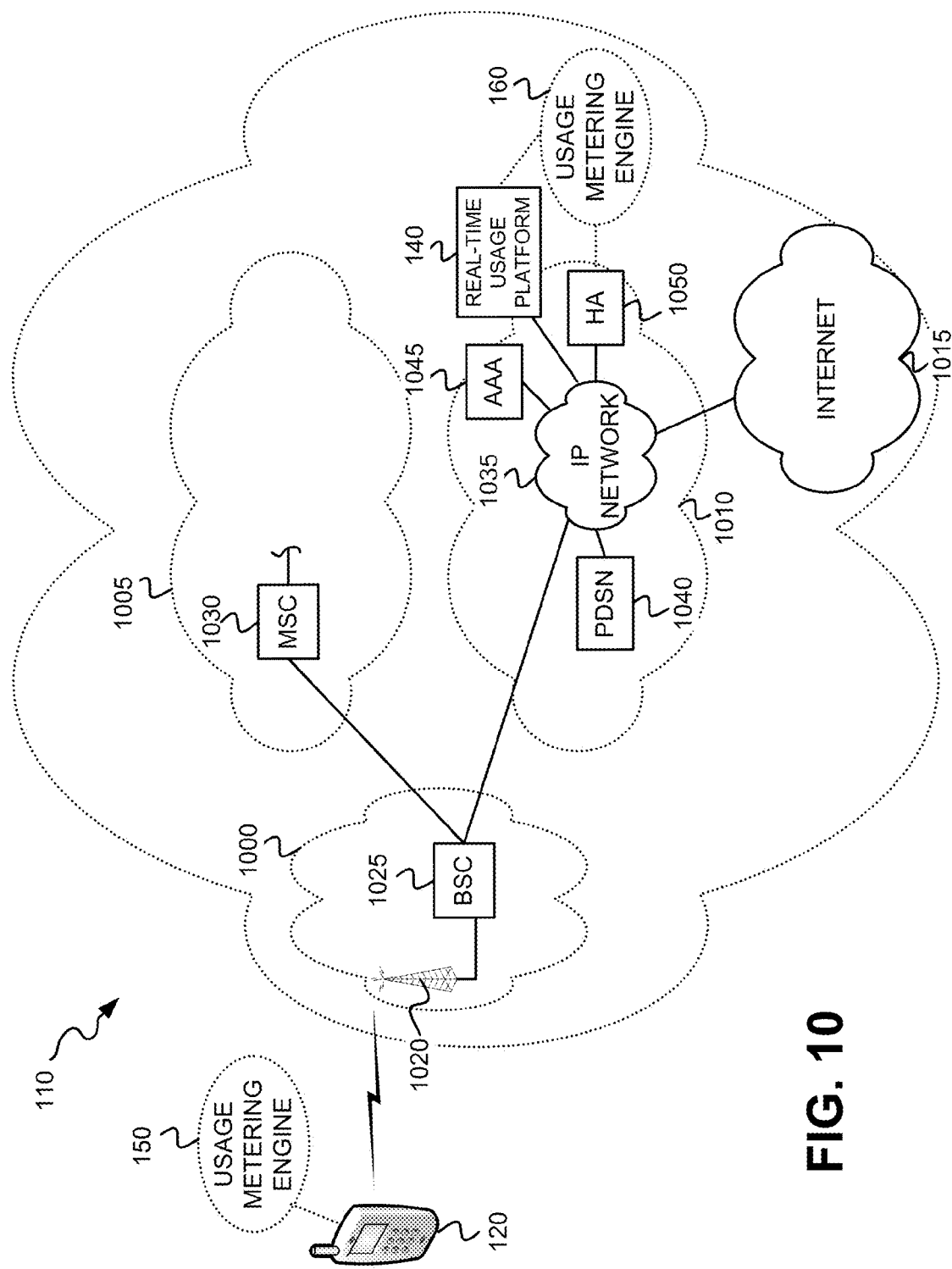
FIG. 10 is a diagram that illustrates an exemplary implementation in which real-time monitoring of subscriber usage occurs in a CDMA2000 PLMN and in which it assumed that the subscriber pre-pays for data usage.

FIG. 10 illustrates an exemplary implementation in which real-time monitoring of subscriber usage occurs in a CDMA2000 PLMN and in which it assumed that the subscriber using subscriber device 120 pre-pays for data usage or subscribes to a specific amount of data usage over a certain time period (e.g., a postpaid subscription plan). In the exemplary implementation of FIG. 10, subscriber device 120 may include, for example, a cellular radiotelephone and usage metering engine 150 may be implemented at the cellular radiotelephone. In addition, usage metering engine 160 may be implemented at real-time usage platform 140, or may be implemented at another node of the CDMA2000 PLMN, such as, for example, the home agent (HA) of the packet-switched portion of the CDMA2000 PLMN.

As shown in FIG. 10, network 110 may include a radio access network (RAN) 1000, a circuit-switched network 1005, a packet-switched network 1010, and the Internet 1015. RAN 1000 may include, among other nodes and devices, a base station 1020 and a base station controller (BSC) 1025. Base station 1020 may send and receive circuit-switched or packet-switched data to/from subscriber device 120 via BSC 1025. BSC 1025 may connect to circuit-switched network 1005 via a mobile switching center (MSC) 1030 that further connects to other components (not shown) of circuit-switched network 1005. BSC 1025 may also connect to packet-switched network 1010 via a private Internet Protocol (IP) network 1035. Packet-switched network 1010 may include a Packet Data Serving Node (PDSN) 1040, an Authentication, Authorization and Accounting (AAA) node 1045, and a home agent (HA) 1050. PDSN 1040 may serve as a routing node in packet-switched network 1010 and may establish and maintain packet data sessions with subscriber device 120. AAA node 1045 provides authentication and accounting functionality for authenticating and authorizing packet data sessions with subscriber device 120. In some implementations, real-time usage platform 140 may be implemented as a stand-alone node (as shown in FIG. 10). In other implementations, real-time usage platform 140 may be incorporated as functionality within AAA node 1045. HA 1050 provides, among other functions, security functionality for packet data sessions with subscriber device 120, and may implement usage metering engine 160.

Figure 11:
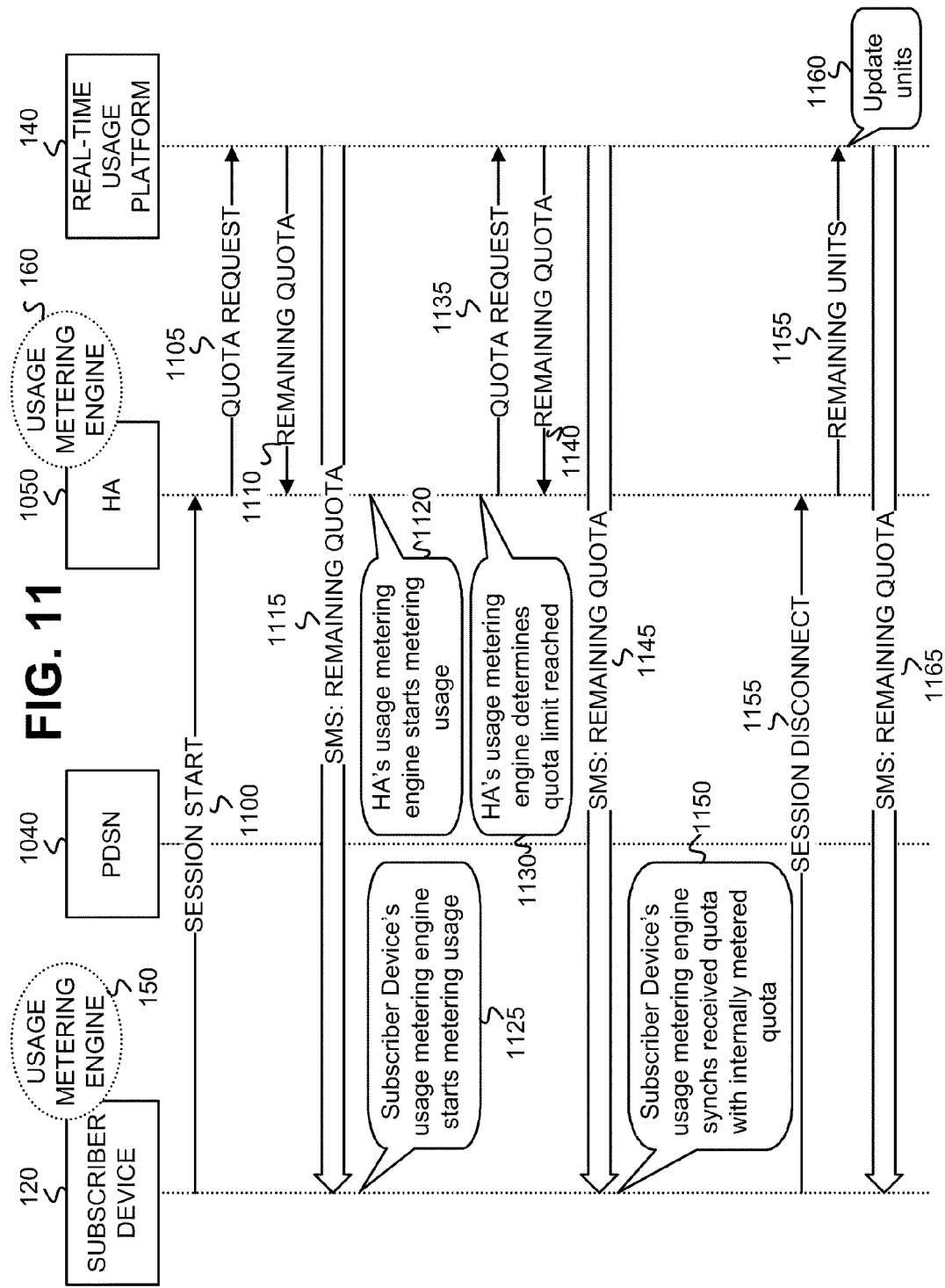
FIG. 11 is an exemplary messaging diagram that provides further details of the implementation of real-time usage monitoring in the CDMA2000 PLMN depicted in FIG. 10.

The messaging diagram of FIG. 11 provides further details of implementation of real-time usage monitoring in the CDMA2000 PLMN depicted in FIG. 10. As shown in FIG. 11, subscriber device 120 may send a message 1100 indicating a start of a session to PDSN 1040 and HA 1050. Upon receipt of message 1100, HA 1050 may send a quota request 1105 to real-time usage platform 140 to request the subscriber's pre-paid quota of service units, or postpaid number of subscribed service units, that are currently available for use by the subscriber. For example, at the start of the session, the subscriber may have a remaining quota of 50 MB of pre-paid data available, or a remaining quota of 50 MB of data available in the subscriber's postpaid subscription plan. Exemplary embodiments described herein may apply to pre-paid service units, or to subscribed service units in a post-pay account (e.g., a permitted amount of data, minutes, messages, etc. for the subscriber over a certain period of time). Real-time usage platform 140 may retrieve the information identifying the subscriber's remaining quota of service units, and may return the information identifying the remaining quota 1110 to HA 1050. Real-time usage platform 140 may also send a SMS message 1115 (or other type of message, such as an IP message) to subscriber device 120 to notify subscriber device 120 of the remaining quota. Upon receipt of remaining quota 1110 from usage platform 140, usage metering engine 160 at HA 1050 may start metering 1120 usage of data during the session by subscriber device 120. Also, upon receipt of SMS message 1115, containing the remaining quota, usage metering engine 150 at subscriber device 120 may start metering 1125 usage of data during the session by subscriber device 120. At some point during the session, usage metering engine 160 at HA 1050 may determine 1130 that the limit of the remaining quota has been reached (i.e., all units in the quota have been depleted). HA 1050 may then send another quota request 1135 to real-time usage platform 140. Usage platform 140 may retrieve the subscriber's remaining quota of service units (e.g., though the subscriber's previous quota may have been depleted, the subscriber may have pre-paid for an additional amount of service units) and may return a message 1140 with the subscriber's remaining quota to HA 1050. Real-time usage platform 140 may also send a SMS message 1145 to subscriber device 120 to notify subscriber device 120 of the new remaining quota. Upon receipt of SMS message 1145, subscriber device 120 may synchronize 1150 the remaining quota contained in SMS message 1145 with the quota internally metered by usage metering engine 150.

At the completion of the session, a message 1155 indicating a session disconnect may be sent from subscriber device 120 to HA 1050. Upon receipt of message 1155, HA 1050 may obtain the remaining units (i.e., unused units) from usage metering engine 160, and may send the remaining units 1155 to real-time usage platform 140. Upon receipt of remaining units 1155, real-time usage platform 140 may update 1160 the subscriber's stored quota of units based on an indication of remaining units 1155 received from HA 1050. Real-time usage platform 140 may then send an SMS message 1165 (or other type of message, such as an IP message), containing the remaining quota of units available to the subscriber, to subscriber device 120 such that usage metering engine 150 may synchronize (not shown in FIG. 11) the metered units stored at subscriber device 120 with the remaining quota of units received from real-time usage platform 140. The remaining quota of units available may be stored at subscriber device 120 for use by usage metering engine 150 during a subsequent session.

As described herein, exemplary embodiments provide mechanisms that permit a subscriber to monitor their network service unit usage in real-time such that they can obtain an accurate accounting of their network service unit usage at any given moment. Real-time monitoring of the subscriber's network service usage can be achieved, as described herein, through the implementation of usage monitoring engines in the subscriber's device (e.g., the subscriber's cellular telephone) and in a network node that independently monitors the subscriber's network service usage. The usage monitoring engine implemented at the network node may send updates regarding the subscriber's network service usage to the usage monitoring engine implemented at the subscriber's device such that the usage metering engine at the subscriber's device may synchronize to the updated values to eliminate error or drift between the usage values metered at the subscriber's device and the usage values metered at the network node. Synchronization of the usage monitoring engine implemented at the subscriber device with the usage monitoring engine implemented at the network node enables accurate, real-time network service usage values to be displayed at the subscriber device.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with regard to FIGS. 7 and 9, the order of the blocks may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A system, comprising:
    a first network device configured to:
        receive a first message from a subscriber device indicating a start of a network session, and
        send a first request to a second network device for a first quota of service units of a subscriber associated with the subscriber device, wherein the subscriber's first quota of service units comprises a first number of service units paid for by the subscriber, and
        receive, from the second network device and responsive to the first request, a second message that includes the subscriber's first quota of service units,
        meter the subscriber device's usage of service units based on the first quota of service units to determine a remaining number of service units,
        determine whether the first quota of service units has been depleted,
        send, if the first quota of service units has been depleted, a second request for a second quota of service units of the subscriber to the second network device,
        receive, from the second network device responsive to the second request, a third message that includes the requested subscriber's second quota of service units, wherein the second quota of service units comprises a second number of service units paid for by the subscriber,
        meter the subscriber device's usage of service units based on the second quota of service units to determine the remaining number of service units,
        receive a first session disconnect message from the subscriber device, and
        send a fourth message indicating the remaining number of service units to the second network device,
    wherein the first network device, the second network device, and the subscriber device are separate devices.

2. The system of claim 1, further comprising:
    the second network device, wherein the second network device is configured to:
        receive the first request for the subscriber's first quota of service units,
        retrieve the subscriber's first quota of service units, and
        send the second message to the subscriber device that includes the subscriber's first quota of service units.

3. The system of claim 1, wherein the first network device provides security functionality for the subscriber device's packet data sessions.

4. The system of claim 3, wherein the first network device comprises a home agent (HA) in a packet-switched network.

5. The system of claim 1, further comprising:
    the second network device, wherein the second network device is further configured to:
        receive the second request for the second quota of service units of the subscriber from the first network device, and
        receive authorization for an additional amount of service units to be added to the second quota of service units.

6. The system of claim 5, wherein the authorization for the additional amount of service units comprises payment for the additional amount of service units.

7. The system of claim 5, wherein, subsequent to receiving the second request for the subscriber's quota of service units, the second network device is further configured to:
    send the third message to the subscriber device that includes the requested subscriber's second quota of service units.

8. The system of claim 1, wherein the first network device is further configured to:
    determine whether the second quota of service units has been depleted, and
    send, if the second quota of service units has been depleted, a third request for a third quota of service units to the second network device.

9. The system of claim 8, wherein the first network device is further configured to:
    receive, responsive to the third request, a fifth message from the second network device that includes the requested subscriber's third quota of service units, wherein the third quota of service units comprises a third number of service units paid for by the subscriber, and
    meter the subscriber device's usage of service units from the third quota of service units to determine the remaining number of service units.

10. The system of claim 1, wherein the subscriber device comprises a mobile broadband air card.

11. The system of claim 1, further comprising:
    the second network device, wherein the second network device is configured to:
        receive the fourth message indicating the remaining number of service units, and
        update an available quota of service units for the subscriber based on the received remaining number of service units.

12. A method, comprising:
    receiving, at a first network device, a first message from a subscriber device indicating a start of a network session;
    sending a first request for a first quota of service units of a subscriber associated with the subscriber device from the first network device to a second network device, wherein the second network device is a different device than the first network device and wherein the subscriber's first quota of service units comprises a first number of service units paid for by the subscriber;
    receiving, at the first network device from the second network device, a second message that includes the subscriber's first quota of service units;
    metering, at the first network device, the subscriber device's usage of service units based on the first quota of service units to determine a remaining number of service units;
    determining, at the first network device, whether the first quota of service units has been depleted;
    sending, if the first quota of service units has been depleted, a second request for a second quota of service units of the subscriber from the first network device to the second network device;

receiving, at the first network device responsive to the second request, a third message from the second network device that includes the requested subscriber's second quota of service units, wherein the second quota of service units comprises a second number of service units paid for by the subscriber;

metering, at the first network device, the subscriber device's usage of service units based on the second quota of service units to determine the remaining number of service units;

receiving, at the first network device, a first session disconnect message from the subscriber device; and sending a fourth message indicating the remaining number of service units from the first network device to the second network device, wherein the first network device, the second network device, and the subscriber device are separate devices.

13. The method of claim 12, wherein the first network device comprises a home agent (HA) in a packet switched network and wherein the second network device comprises a usage monitoring platform.

14. The method of claim 12, further comprising:
determining, at the first network device, whether the second quota of service units has been depleted; and
sending, if the second quota of service units has been depleted, a third request for a third quota of service units from the first network device to the second network device.

15. The method of claim 14, further comprising:
receiving, at the first network device responsive to the third request, a fifth message from the second network device that includes the requested subscriber's third quota of service units, wherein the third quota of service units comprises a third number of service units paid for by the subscriber; and
metering, at the first network device, the subscriber device's usage of service units from the third quota of service units to determine the remaining number of service units.

16. The method of claim 12, wherein the subscriber device comprises a mobile broadband air card.

17. The method of claim 12, wherein the subscriber device is a different device than the first and second network devices.

* * * * *